United States Patent [19]

Smith et al.

[11] B 3,986,634
[45] Oct. 19, 1976

[54] TORQUE LIMITER MECHANISM

[75] Inventors: Claude A. Smith, Sandusky; Donald L. Williams, Port Clinton, both of Ohio

[73] Assignee: General Motors Corporation, Detroit, Mich.

[22] Filed: Oct. 18, 1974

[21] Appl. No.: 516,032

[44] Published under the second Trial Voluntary Protest Program on January 27, 1976 as document No. B 516,032.

Related U.S. Application Data

[63] Continuation-in-part of Ser. No. 476,657, June 5, 1974.

[52] U.S. Cl. ............................. 220/288; 220/304
[51] Int. Cl.² ......................................... B65D 41/04
[58] Field of Search .......... 220/288, 200, 296, 304, 220/203, 39; 215/220, 9; 192/46

[56] References Cited
UNITED STATES PATENTS

| | | | |
|---|---|---|---|
| 2,101,758 | 12/1937 | Shaffer | 220/200 |
| 2,613,012 | 10/1952 | Taylor | 220/296 |
| 3,023,924 | 3/1962 | Boyer | 220/288 |
| 3,343,697 | 10/1967 | Roberts | 215/220 |
| 3,589,486 | 6/1971 | Kelch | 192/46 |
| 3,616,960 | 11/1971 | Miller | 220/304 |
| 3,666,137 | 5/1972 | Blau | 220/288 |
| 3,667,642 | 6/1972 | Blau | 220/288 |
| 3,682,343 | 8/1972 | Landen | 215/9 |
| 3,715,075 | 2/1973 | Blau | 220/288 |
| 3,815,776 | 1/1971 | MacMillan | 220/288 |
| 3,820,680 | 1/1975 | Friend | 220/203 |
| 3,831,801 | 1/1975 | Rodgers | 220/39 |

*Primary Examiner*—William Price
*Assistant Examiner*—Ro E. Hart
*Attorney, Agent, or Firm*—J. C. Evans

[57] ABSTRACT

A two piece torque release mechanism includes a metal cover having a peripheral flange with a plurality of circumferentially spaced, cam surfaces each including ramp and notch segments intersecting at a sharp radius point radially inwardly of a land segment; a plurality of integrally formed fingers on a driven member are sprung radially outwardly into operative engagement with the cam surfaces. Each finger has a sharp radius tip portion formed by the intersection of a flat radial surface and an inclined slip surface; the radial surfaces and notches define a positive interlock between the cover and the driven member for removing the driven member; the slip surfaces are mateable with the cam ramp segments to produce a torque release couple between the cover and the driven member to prevent overtightening of the driven member and to produce a reverse slip movement of each finger following torque release for parking the tip portions against the cam land segments so as to maintain the fingers in an unstressed position when the driven member is in place.

1 Claim, 6 Drawing Figures

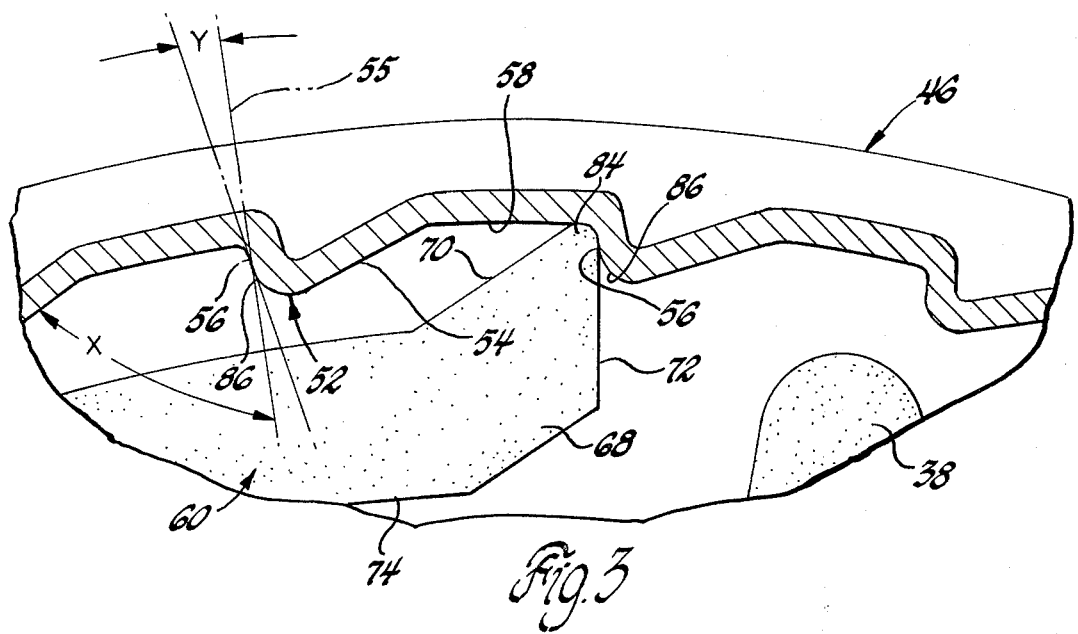
Fig. 3
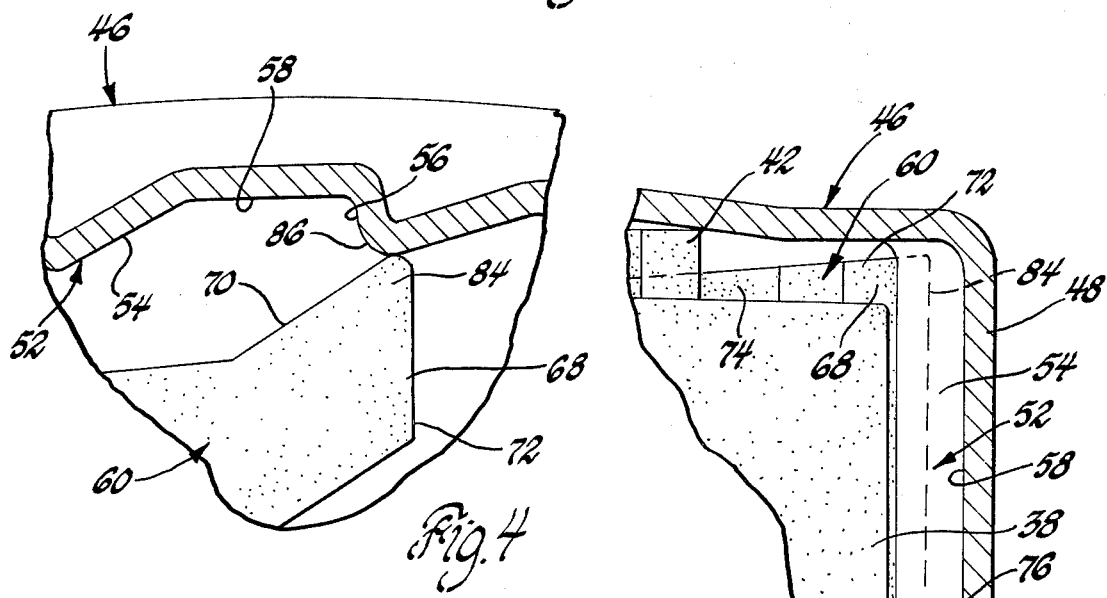
Fig. 4
Fig. 6
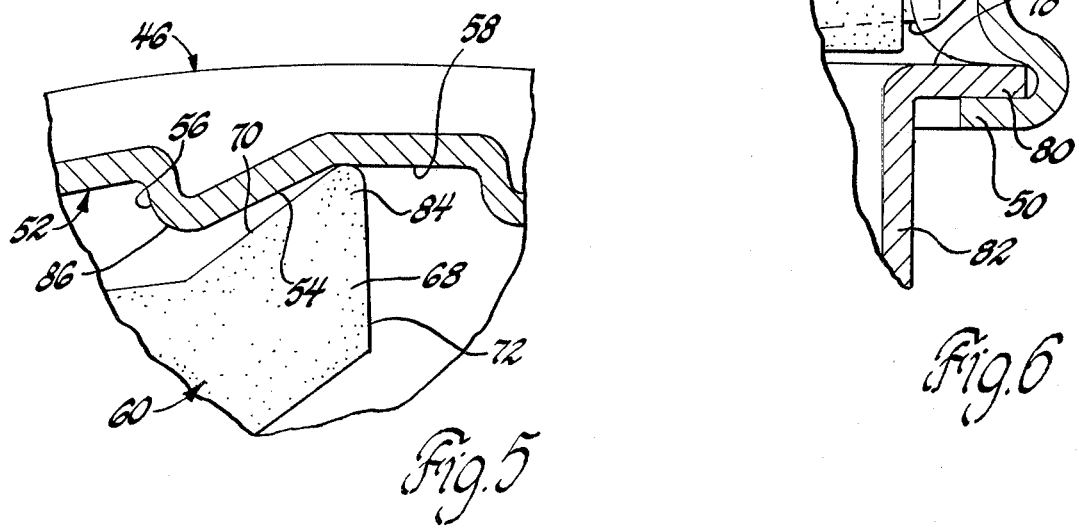
Fig. 5

TORQUE LIMITER MECHANISM

This is a Continuation-in-Part of Ser. No. 476,657 filed June 5, 1974.

The invention relates to torque release mechanisms and more particularly to torque release mechanisms that positively drive in one direction of rotation and which produce a positive drive in the opposite direction of rotation followed by torque release when a predetermined drive torque occurs.

Torque release mechanisms of the aforesaid type are used between a gas tank cover and a closure member for a filler neck. One such arrangement has a slip clutch mechanism defined by spring biased clutch faces of the type disclosed in U.S. Pat. No. 2,101,758 to Shaffer. Such an arrangement requires separate spring elements for maintaining a predetermined bias between the clutch faces to establish a torque release level between the cover and the closure components of the assembly.

Yet another proposal for such torque release mechanism is disclosed in U.S. Pat. No. 3,715,075 to Blau which includes spring loaded radial drive elements interposed between a closure member and a cover to produce a controlled torque release to prevent overtightening of the closure member in a filler neck. Separate spring and drive elements are found in the mechanism.

The use of integral members on a cover and a driven member to produce a torque release action when the driven member is subjected to a predetermined drive torque in disclosed in U.S. Pat. No. 3,343,697 to Roberts et al. In this patent the torque release members are formed as axially aligned faces with slip surfaces which are operative when a release spring is compressed; when the clutch is inoperative the mechanism is extended axially thereby increasing the space required for including the feature. In U.S. Pat. No. 3,667,642 to Blau et al a torque release closure is disclosed with clutch components being integrally formed on a manually operated drive member and a closure member. Spring arms formed integrally on the closure can be stressed between the drive member and closure. Another clutch mechanism of the aforesaid type is disclosed in U.S. Pat. No. 3,815,776 issued June 11, 1974, to MacMillan. This patent discloses radially configured, integral slip clutch fingers on the driven member and integral cam protrusions on the drive cover. The protrusions include flat end surfaces which can support the fingers in a stressed condition following torque release.

Ratchet type release clutches with integral spring biased pawl fingers are disclosed in U.S. Pat. No. 3,682,343 to Landen and 3,589,486 to Kelch. In these arrangements there is no provision to assure that the arms will always return to an unstressed position following torque release.

Accordingly, an object of the present invention is to provide an improved torque release mechanism embodying integral clutch components on a cover drive member and a driven member including a plurality of integrally formed, radially outwardly directed fingers each having a sharp radius tip formed by intersecting radial and inclined surfaces operatively engageable with circumferentially spaced, radially inwardly directed cam surfaces on the outer periphery of the driven member to produce a controlled torque releasable connection between the cover and the driven member for tightening the driven member and wherein the integral fingers are compressible upon a predetermined closure torque to prevent overtightening of the closure member and wherein an intersecting radial surface and an inclined slip surface are provided on the cam surface to define a sharp radius tip so that after the driven member is torque released the sharp radius tipped fingers will slip with respect to the cam surfaces on the cover to assume a parked position on a land surface between the cams to stress relieve the fingers following torque release thereby to prevent cold set distortion of the fingers and wherein spacer means are associated with the drive member and closure member to locate the fingers in spaced axial relationship between the drive member and closure member to assure free radial movement of the fingers between stressed and unstressed positions.

These and other objects of the present invention are attained in one working embodiment that includes a driven closure member. The closure member includes an integral skirt portion having an integrally formed external helical thread thereon with a start and end portion which evolves smoothly from the root to the crest of the thread in one quarter turns. Immediately above the threaded skirt the closure member includes a peripheral groove having an O-ring seal therein that is located in sealing engagement with the upper end of the filler neck when the cap is in place.

A rigid cover drive member is located over the driven closure member. It includes an internal surface on its outer periphery having a plurality of radially inwardly formed cams thereon immediately above a depending skirt that is located in juxtaposed surrounding relationship to the upper end of the filler neck when the cap is in place. Each cam has a sharp radius tip formed between a radial surface and an inclined ramp surface.

A plurality of integral flexible fingers extend radially outwardly of the closure member and include trailing portions with sharp radius tips formed between a radial surface and an inclined ramp surface. The ramp surfaces are seated against each other to interlock the rigid cover to the closure member through a torque responsive coupling that will maintain the cover and closure member directly connected until the closure member is threadably seated within the filler neck at a location to maintain the O-ring seal there-against. Thereafter, closing torque will cause the trailing portions of the fingers to yield radially inwardly and the inclined ramps on the fingers to shift with respect to the inclined ramps on the cams to cause the cover to be rotated in a stepwise fashion with respect to the seated plastic closure member so as to control the transfer of torque between the cover and closure member to prevent overtightening. Following torque release the tips of the fingers slip with respect to the tips of the cams to assume an at rest position on lands intermediate the cams so as to stress relieve the fingers to prevent cold set distortion therein.

Further objects and advantages of the present invention will be apparent from the following description, reference being had to the accompanying drawings wherein a preferred embodiment of the present invention is clearly shown. In the Drawings:

FIG. 1 is a view partially in vertical section and partially in elevation of a torque release mechanism for use in fuel filler cap assembly and the like;

FIG. 3 is a fragmentary, enlarged horizontal cross sectional view of finger and cam components in a cap release position;

FIG. 4 is a fragmentary enlarged sectional view like FIG. 3 showing finger and cam components in a torque release position;

FIG. 5 is a framentary enlarged sectional view of the cam surfaces and torque release fingers of the embodiment in FIG. 3 in a park position; and FIG. 6 is a fragmentary, enlarged vertical sectional view taken along the line 6—6 of FIG. 2.

Figure 1:
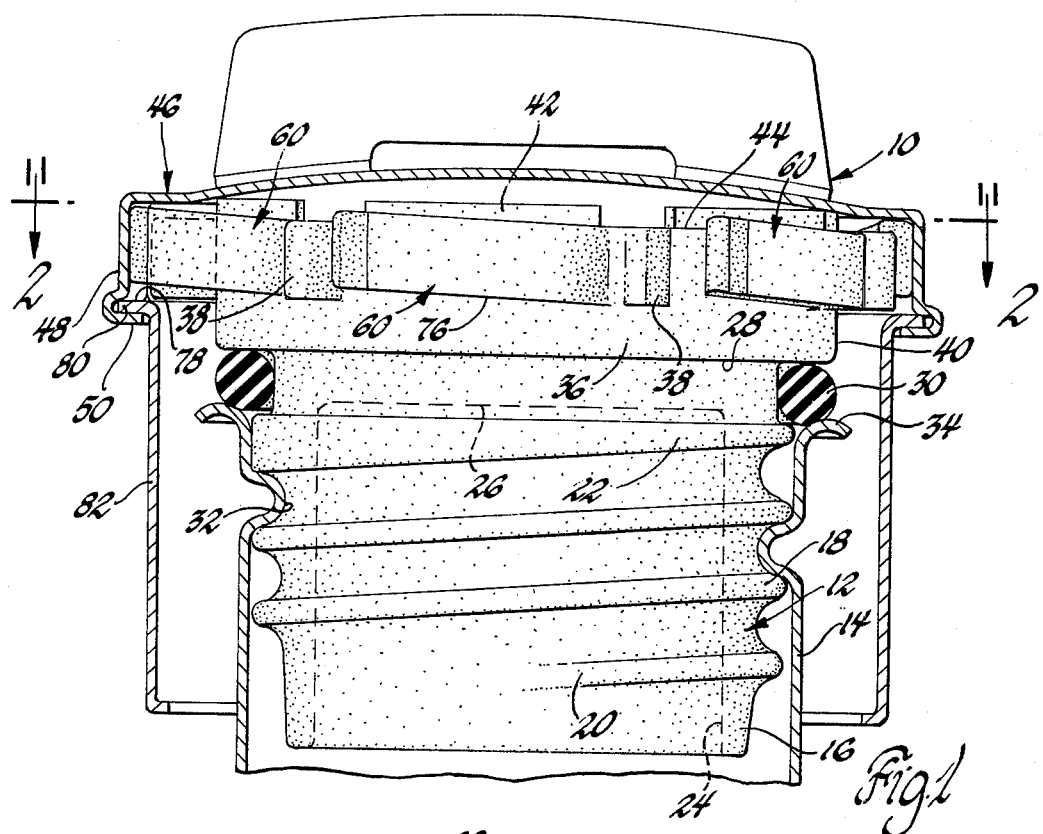

Referring now to the drawings, in FIG. 1, a torque release fuel filler cap 10 is illustrated. It includes a plastic screw closure member 12 preferably made of Delrin 500, an aceytal resin made by DuPont Company, or Valox 310, a polyester resin made by General Electric Company.

The closure member 12 screws onto an internally threaded fuel filler neck 14 for supplying fuel to a tank (not shown).

The closure member 12 includes a depending, tubular skirt portion 16 having a helical thread 18 formed on the outer periphery thereof. The thread 18 is formed to provide four threads per inch with three full turns of the thread being a minimum. The start 20 and the end 22 of the thread evolve smoothly from root to crest of the thread within one quarter turns.

The skirt has a large diameter internal bore 24 directed therethrough opened at the bottom of the skirt 16 and closed at the top thereof by an upper partition wall portion 26 on the screw closure member 12 formed transversely of the skirt 16.

The screw closure member 12 includes a peripheral groove 28 therein radially outwardly of the partition wall 26. An O-ring seal 30 is supportively received within the groove 28.

As illustrated in FIG. 1, the screw closure member 12 is threadably connected to an internal thread 32 in the filler neck 14. The thread is located below an outwardly flared upper edge 34 forming the open end of the neck 14. When the cap assembly is seated in a sealed relationship within the neck 14, the O-ring 30 is held in sealed engagement with the upper edge 34 to seal between the screw closure member 12 and the neck 14.

The screw closure member 12 further includes an integral, large diameter upstanding peripheral end flange 36 having a plurality of circumferentially spaced lugs 38 thereon each directed radially outwardly from the outer periphery 40 of the flange 36. A plurality of arcuate ribs 42 are formed on the upper surface 44 of member 12.

A cover 46 is telescopingly received over the flange 36. It includes a continuously circumferentially formed dependent flange 48 with a radially inwardly turned edge 50. The inner surface of the flange 48 has a plurality of circumferentially spaced cam surfaces 52 each including a ramp segment 54 and a notch segment 56 having a land 58 formed therebetween. The cam surfaces 52 in the present invention are 36 in number and are equally spaced around the inner surface of the peripheral flange 48 as best seen in FIG. 1. Each of the ramp segments 54 has an inclination of 60° with respect to the cap center line 55 as represented by the angle X in FIG. 3 and each of the notch segments 56 are formed at a reverse inclination of 8° with respect to the center line of the cap as shown by angle Y in FIG. 3.

The flange 36 has 6 equally, circumferentially spaced integrally formed fingers 60 each having a radial root portion 62 and arcuate trailing portion 64 spaced from flange 36 by a slot 66 and with a tip 68 formed thereon. Each of the tips includes an inclined ramp 70 thereon having an inclination corresponding to that of the cam ramp 54 and further includes a radially inwardly directed flat stop surface portion 72 thereon. The fingers 60 each include a radially inwardly located curved surface 74 thereon which is spaced from the outer periphery of the flange 36 by the slot 66 to permit inward flexing movement of the fingers 60 with respect to the closure member 12. Each of the fingers has a predetermined spring action so as to be biased outwardly against the cam surfaces 52.

In order to assure freedom of flexural movement each finger 60 is axially inclined from its root 62 to its tip 68 as best seen in FIG. 1. The inclination raises the bottom edge 76 of each finger 60 to be axially spaced from the upper edge 78 of a flange 80 on a collar 82 that is secured to cover 46 by the turned edge 50 thereon. As seen in FIGS. 1 and 6, lugs 38 contact edge 78 to maintain axial separation between the edge 76 of finger 60 and collar 82. The ribs 42 contact the underside of cover 46 to assure axial separation between tips 68 and cover 46. Thus, each finger 60 is free to flex radially inwardly and outwardly of flange 36.

Each finger 60 is configured to have an outer peripheral sharp radius 84 thereon engageable with sharp radius peaks 86 formed on each of the cam notches 56. Accordingly, when the closure member 12 is threadably inserted in a filler neck by clockwise rotation of the cover 46 as viewed in FIG. 2 the cover 46 will be coupled by the fingers 60 to the closure member 12 up to a predetermined limiting torque at which point the inclined surface 70 on each of the tips 68 will slip across each of the cam ramps 54 in a ratchet like fashion to prevent overtightening of the closure member 12 in the filler neck.

One feature of the invention is the provision of the sharp radius surfaces 84, 86 and a preselected cam ramp inclination and a like inclination on the inclined surface 70 of each of the tips 68. These angles are selected such that their tangent exceeds the coefficient of friction between the cam ramp 54 and the plastic finger ramp surface 70 so that the tips 68 of the fingers will always slip downwardly with respect to the cam surfaces 52 into a park position against the lands 58 as shown in FIG. 5. Thus if the tips 68 of fingers 60 are positioned, following torque release of the cover 46, against one of the peaks 86 as shown in FIG. 4, they will slip downwardly on the ramp 84 into the park position shown in FIG. 5.

This avoids operation that might cause fingers 60 to be pressed radially inwardly toward the flange 36 so that following a period of time creep deformation of the plastic fingers might result with consequent reduction of the torque required to positively rotate the closure member into a closed threaded position within a filler neck.

The selection of the aforesaid sharp radius surfaces 84, 86 and the inclination of the cam ramp 54 and the inclined surfaces 70 on each of the fingers 60 and the sliding action therebetween will assure that the fingers 60 are located in the position illustrated in FIG. 5 thereby to be relatively unstressed when parked following torque release. The axial spacing produced by lugs 38 and ribs 42 further assures that the fingers 60 will be free to move to the unstressed position in FIG. 5.

Figure 2:
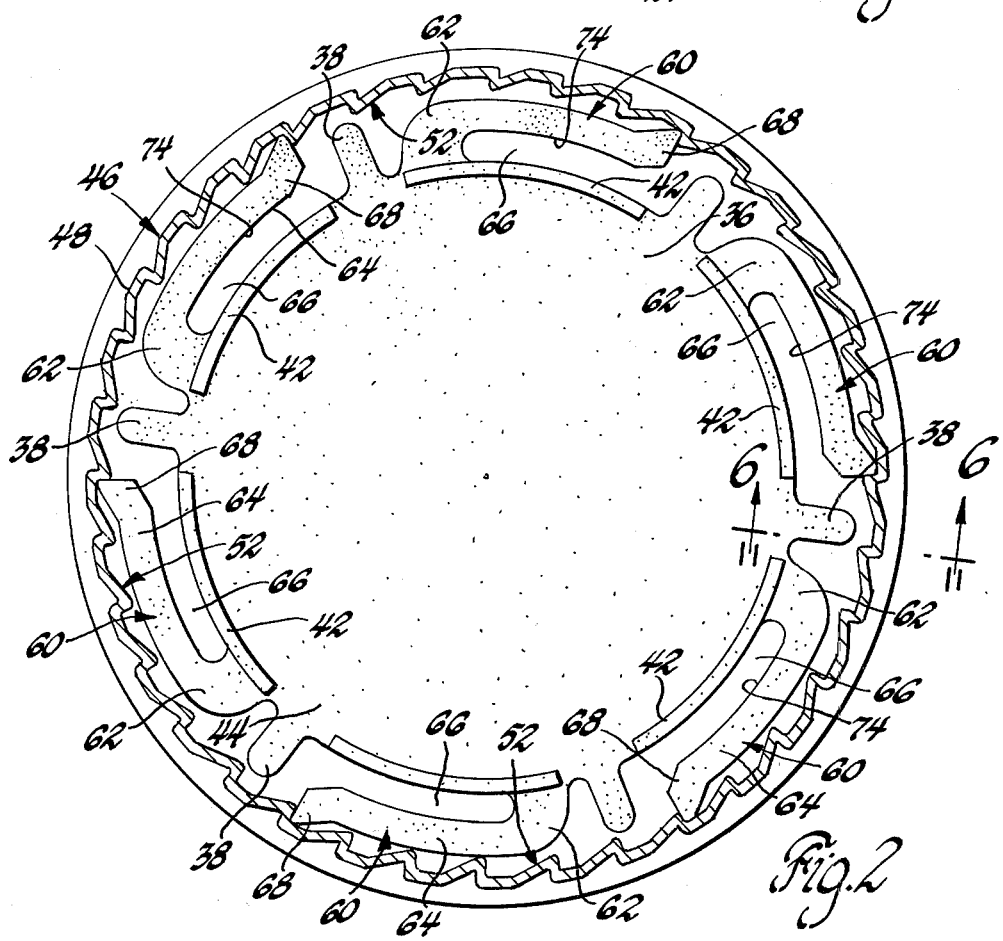
FIG. 2 is a view in horizontal section taken along the line 2—2 of FIG. 1 looking in the direction of the arrows.

Removal of the closure member 12 from the filler neck 14 is produced by rotation of the cover 46 in a counter-clockwise direction as seen in FIG. 2. Such rotation will move the cam notches 56 against the flat radial surfaces 72 of the fingers 60 as seen in FIG. 3 to produce a positive interlock between the cover 46 and the closure member 12 as it is threaded from the filler neck.

While the embodiments of the present invention, as herein disclosed, constitute a preferred form, it is to be understood that other forms might be adopted.

What is claimed is:

1. A torque release clutch mechanism comprising cover means having a top portion and a continuously formed circumferential flange thereon, a plurality of circumferentially spaced cam surfaces on the interior of said flange, each of said surfaces including a cam ramp and a cam notch having a land portion formed therebetween, a curved peak joining each of said ramps to an adjacent cam notch, a driven member having a head portion thereon with a peripheral flange received within said cover for rotation relative thereto, means for connecting said cover means and driven member against axial separation, a plurality of fingers formed integrally with said peripheral flange and of material tending toward a cold set distortion under prolonged stress, each finger having a root directed radially outwardly of said peripheral flange, each of said fingers including an arcuate segment joined to said root and having a tip biased radially outwardly of said peripheral flange and compressible radially inwardly toward said peripheral flange, each of said tips including a flat radially inwardly directed stop surface thereon engageable with said cam notches to interlock said cover with said driven member upon a first relative rotation therebetween, each of said tips further including an inclined surface thereon, a sharp radius curve on said tip joining said stop surface and said inclined surface, said sharp radius curve being mateable with each of said cam ramps and movable thereacross to produce a limited resistance to relative rotation between said cover and said driven member upon rotation of said cover in a direction opposite to said first relative rotation and a torque release between said curved peaks and said sharp radius curves, to assure movement of said fingers radially outwardly to an unstressed park position on said land portion following movement of said fingers radially inwardly on said cam ramps, said inclined surface and said cam ramp having an angle of inclination whose tangent exceeds the coefficient of friction between said inclined surface and said cam ramp whereby said fingers will slip radially outwardly on said cam ramps if they are located thereon following cap tightening to assume an unstressed park position on said land portions following cap tightening, said flange having lugs formed integrally thereof at spaced circumferential points thereon to space said finger roots from said cover means, a plurality of ribs formed on said driven member engageable with said cover to space said finger tips axially of said cover means whereby said fingers are free to flex between said peripheral flange and said cam surfaces during movement thereof across said cam surfaces between torque released positions on said cam ramps and unstressed park positions on said land portions.

* * * * *